A. H. ASPROOTH.
POWER PULLEY MOUNTING FOR TRANSMISSION MECHANISM.
APPLICATION FILED AUG. 4, 1919.
1,400,510.
Patented Dec. 20, 1921.
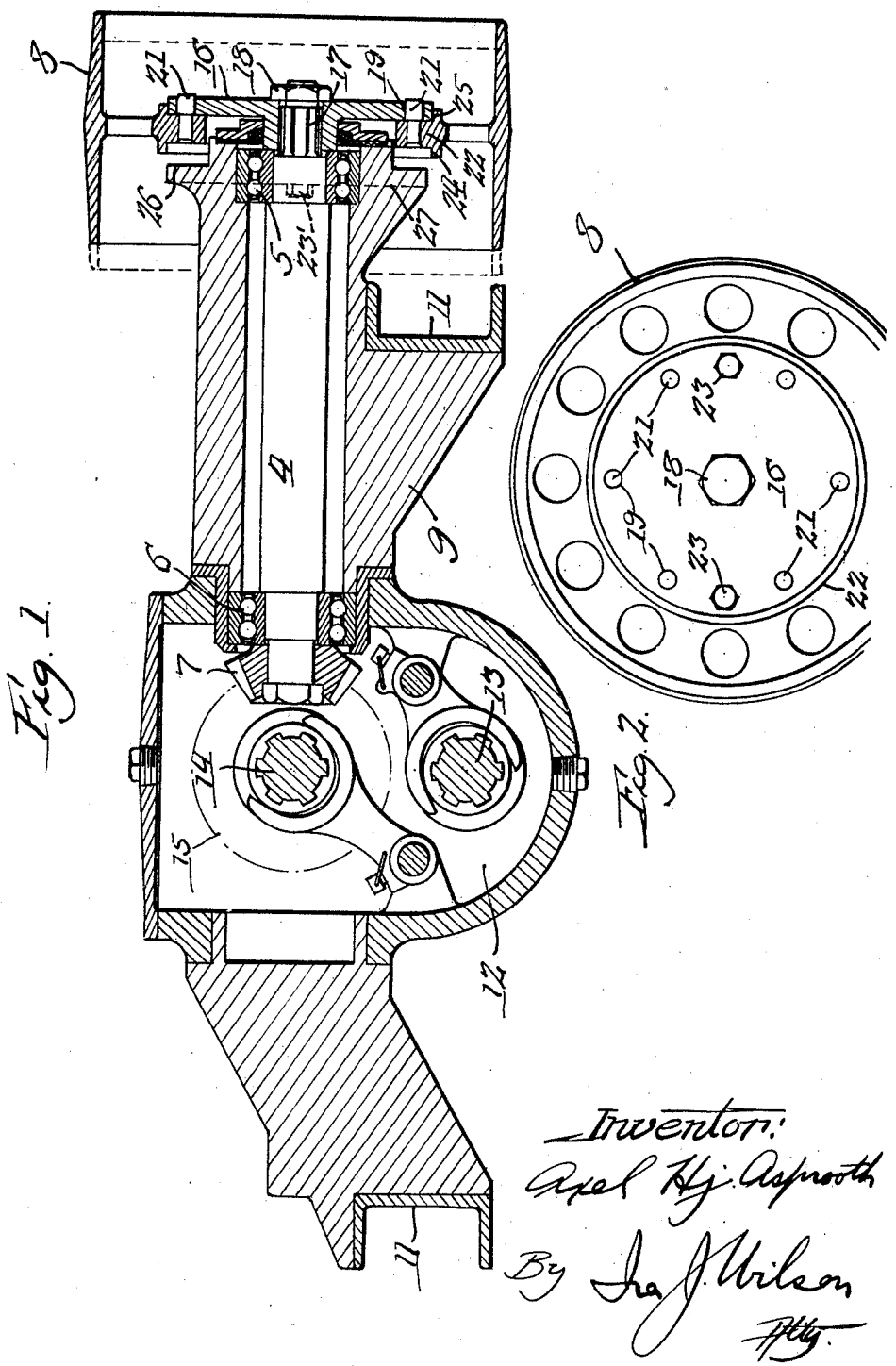

UNITED STATES PATENT OFFICE.

AXEL HJ. ASPROOTH, OF ROCKFORD, ILLINOIS, ASSIGNOR TO COTTA TRANSMISSION COMPANY, OF ROCKFORD, ILLINOIS, A CORPORATION OF ILLINOIS.

POWER-PULLEY MOUNTING FOR TRANSMISSION MECHANISM.

1,400,510.    Specification of Letters Patent.    Patented Dec. 20, 1921.

Application filed August 4, 1919. Serial No. 315,099.

*To all whom it may concern:*

Be it known that I, AXEL HJ. ASPROOTH, a citizen of the United States, residing at Rockford, in the county of Winnebago and State of Illinois, have invented certain new and useful Improvements in Power-Pulley Mountings for Transmission Mechanism, of which the following is a specification.

This invention pertains in general to transmission mechanism adapted for tractors and motor trucks, and has more particular reference to that class employing a power pulley, such as is used for transmitting belt power for various purposes.

The primary object of my invention is to so mount the power pulley on an end of the power shaft that the pulley may be detached at will and remounted in a stationary idle position in which to constitute a guard casing about the live end of said shaft. When this feature is embodied in a transmission mechanism of the character described in application Serial No. 308,075 it obviates the necessity of a clutch in the power pulley drive for disconnecting the power pulley when not in use, and thus effects a material reduction in the cost of producing a transmission having the characteristics in mind.

Another object of my invention resides in the provision of a power pulley mounting of the character described adapted for general application to tractors of various descriptions, and which is so designed that it will serve effectually the purposes in mind and is capable of production at a comparatively low cost.

Referring to the drawing,—

Figure 1 is a transverse vertical section through a transmission mechanism of the type described in the application mentioned above, showing my improved power pulley mounting; and Fig. 2, an end view of a power pulley mounted in operative position.

My invention comprehends the mounting of a power pulley or similar driving element in a novel manner, irrespective of the nature or construction of the transmission mechanism *per se*. I have, however, for the purpose of illustrating certain advantages of my improvements, shown them in connection with a transmission mechanism or change speed gearing of the type disclosed in the above entitled application. A single view only from said application will suffice. Referring to Fig. 1, it will be seen that the power shaft 4 mounted at its outer and inner ends in bearings 5 and 6 respectively, is equipped at its inner end with a bevel gear 7 and extends at its outer end beyond the bearing 5 and is adapted to have attached to such outer end, a power pulley designated generally by character 8. The bearings 5 and 6 are supported by a casing structure designated generally by character 9, in turn supported by the channel beams 11 of the tractor frame. The gear compartment 12 contains gearing not shown, and through this compartment the driving and driven shafts 13 and 14 respectively, pass, the latter shaft being equipped with a bevel gear, indicated by the pitch line 15, meshing with the bevel gear 7. Thus in a transmission mechanism of this kind, no clutch is provided between the gear 15 and the power pulley shaft 4.

As regards the mounting of the power pulley 8, my invention contemplates attaching this pulley in rigid driving connection to the power shaft 4, and the provision of means permitting the pulley to be detached from the shaft and remounted in a stationary idle position in which the pulley flange constitutes a stationary guard or casing about the live end of the shaft. This is effected in a very simple manner, in the present case, simply by removing two cap screws and inserting them again in different holes for remounting the pulley. Thus when the power pulley is not in use, it will be disconnected from its drive shaft and held in an idle position, although serving at the same time to prevent interference with the live end of the power shaft. An advantage following from the use of this feature in connection with a transmission mechanism of the character mentioned above, is that it obviates the necessity of a shiftable clutch between the power pulley and its driving shaft, or between this shaft and a driving member. It will be manifest that a material saving in the cost of production is obtained and at the same time the construction is very practical.

Referring now to the drawing, an annular plate 16, the hub of which is splined on the end 17 of the shaft 4 and further secured thereon by a nut 18, is provided at circumferentially spaced points with holes 19 for the reception of locating and driving pins 21 fixed to the hub 22 of the pulley. Cap screws 23, Fig. 2, passing through the plate 16 and threadingly engaged in the hub 22 rigidly secure the power pulley to said plate. It will be observed that the hub 22 is disposed at the inside of the plate 16 and has inner and outer annular shoulders 24 and 25 respectively, the latter of which seats on the periphery of the plate 16. It will be further noted that the casing 9 is shaped to provide an annular seat 26 spaced inwardly from the hub 22 when the pulley is in operative position. By removing the cap screws 23, the power pulley may be shifted inwardly to a position on the seat 26 and by passing the cap screws 23 through the wall 27 from the inner side thereof, as indicated in Fig. 1 by 23', and threadingly engaging these screws in the hub 22, the power pulley will be rigidly secured to the frame or casing 9 in a position entirely withdrawn from the plate 16. In this position, the flange of the power pulley circumscribes the plate 16 and effectually serves as a protective casing about this plate, and consequently, the live end of the shaft 4. Thus when the power pulley is not needed, it will be shifted to and secured in the idle position just described, and when it is to be used, it will be remounted on the plate 16, as will be obvious.

It is believed that the foregoing conveys a clear understanding of the principles and objects of my invention, and while I have illustrated and described but a single working embodiment thereof, it should be understood that various changes might be made in the construction and arrangement without departing from the spirit and scope of the invention as expressed in the appended claims, in which—

I claim:

1. In a transmission mechanism, the combination of a frame, a power pulley shaft journaled therein, a power pulley detachably mounted on the end of said shaft, and means for fixedly connecting the power pulley to and supporting it from the frame structure in such position that the pulley circumscribes said end of the power pulley shaft and constitutes a stationary guard therefor.

2. In a transmission mechanism, the combination of a power pulley shaft, a power pulley, parts coöperative between the shaft and pulley for centering the latter on the shaft and permitting disconnection of the pulley therefrom, and means for supporting the pulley in a stationary idle position concentric with the shaft and about the end thereof.

3. In a transmission mechanism, the combination of a casing or frame structure, a power pulley shaft adapted to be driven by said mechanism and extending to the exterior of said frame structure, a power pulley detachably mounted on the exterior end of said shaft, and means for supporting the pulley in a stationary position in which the pulley serves as a guard casing surrounding said exterior end of the power pulley shaft.

4. In a transmission mechanism, a power shaft carrying an annular member having a plurality of circumferentially spaced holes, a power pulley the hub of which carries parts adapted to enter said holes to center the pulley on the shaft, the pulley being removable from said member and shiftable longitudinally of its axis to a stationary idle position in which the pulley is disconnected from said shaft member and the flange of the pulley constitutes a guard casing about the same.

5. In a transmission mechanism, the combination of a casing structure inclosing a gear compartment, gearing within said compartment, a power pulley shaft journaled in bearings supported by the casing structure and extending to the exterior thereof and having driving connection with said gears, a power pulley detachably mounted on said exterior end of said shaft, and means for supporting the pulley in a stationary position in which the pulley flange serves as a casing and guard about said exterior end of the power pulley shaft.

6. The combination with a transmission mechanism having an outwardly projecting power shaft, a driving member detachably mounted on the projecting end of said shaft, and means for supporting said member in an idle position substantially concentric with said shaft and embracing the said projecting end thereof.

AXEL HJ. ASPROOTH.